(12) United States Patent
Li

(10) Patent No.: US 12,144,318 B2
(45) Date of Patent: Nov. 19, 2024

(54) PERSONAL PET CARRIER

(71) Applicant: Pei H Li, Whittier, CA (US)

(72) Inventor: Pei H Li, Whittier, CA (US)

( * ) Notice: Subject to any disclaimer, the term of this patent is extended or adjusted under 35 U.S.C. 154(b) by 0 days.

(21) Appl. No.: 18/053,346

(22) Filed: Nov. 7, 2022

(65) Prior Publication Data

US 2024/0147956 A1  May 9, 2024

(51) Int. Cl.
*A01K 1/02* (2006.01)
(52) U.S. Cl.
CPC ............ *A01K 1/029* (2013.01); *A01K 1/0263* (2013.01)
(58) Field of Classification Search
CPC .............................. A01K 1/029; A47D 13/025
See application file for complete search history.

(56) References Cited

U.S. PATENT DOCUMENTS

| | | | | |
|---|---|---|---|---|
| 6,460,746 B1* | 10/2002 | Amram | ................... | A45F 3/047 |
| | | | | 224/628 |
| 8,579,168 B2* | 11/2013 | Zack | ................... | A47D 13/025 |
| | | | | 224/159 |
| 9,439,515 B2* | 9/2016 | Kim | ................... | A47D 13/025 |
| 9,781,901 B2 | 10/2017 | Rivera | | |
| 10,321,661 B2 | 6/2019 | Kath | | |
| 11,122,912 B2* | 9/2021 | Massale | .................. | A44B 11/28 |
| 11,272,685 B2 | 3/2022 | Watson et al. | | |
| 2005/0017041 A1* | 1/2005 | Roberts | ................... | A45F 3/04 |
| | | | | 224/642 |
| 2005/0103815 A1* | 5/2005 | Lee | .................. | B60R 11/0211 |
| | | | | 224/579 |
| 2006/0138188 A1* | 6/2006 | Kramer | ................... | A45F 3/08 |
| | | | | 224/648 |
| 2007/0012261 A1* | 1/2007 | Altieri | .................. | A01K 1/029 |
| | | | | 119/770 |
| 2012/0217273 A1* | 8/2012 | Gunter | ................. | A47D 13/025 |
| | | | | 224/159 |
| 2015/0374139 A1* | 12/2015 | Salazar | ................ | A47D 13/025 |
| | | | | 224/160 |
| 2019/0350379 A1* | 11/2019 | Antunovic | ........... | A47D 13/025 |
| 2021/0100340 A1* | 4/2021 | Chang | ..................... | A45F 3/047 |
| 2022/0061263 A1 | 3/2022 | Watson | | |
| 2023/0232783 A1* | 7/2023 | Wang | .................... | A01K 1/029 |
| | | | | 119/497 |

OTHER PUBLICATIONS

Maier R; WO-2016096150-A1 (Year: 2016).*
Product: K9 Sport Sack® Knavigate; Company: K9 Sport Sack LLC; Website: https://www.k9sportsack.com/; Published: Jan. 7, 2012 (according to Internet Archive (https://web.archive.org/)).

* cited by examiner

*Primary Examiner* — Monica L Perry
*Assistant Examiner* — Brittany A Lowery
(74) *Attorney, Agent, or Firm* — Kenyon Jenckes

(57) ABSTRACT

A personal pet carrier according to an embodiment may include a bag portion to house the lower body of a pet. The sides of the bag may include open slits to facilitate scooping the pet's hind quarters and lower body into the bag. Side straps are provided near the top of the slits. A molle harness system enables the side straps to be positioned at different heights to accommodate the size of the pet. A collar strap and choke prevention strap connected between the collar strap and the front side of the bag may be provided to further secure the pet.

4 Claims, 8 Drawing Sheets

PERSONAL PET CARRIER

TECHNICAL FIELD

The technical field of the disclosed embodiments relate to personal pet carriers. More particularly, the disclosed embodiments relate to pet carriers with a backpack or front pack harness system.

BACKGROUND

Pet owners may enjoy engaging in activities with their pets, such as travel, hiking, or other activities that require extended periods of walking which their pets may not be capable of due to the pet's size, age, or various health issues. Such pet owners may seek a solution that allows them to participate in activities they find enjoyable and include their pet companion with which they may not otherwise be capable of enjoying with them.

One possible solution is the use of a pet carrying harness system, or pet carrier. Various types of pet carriers are available, some of which enable the pet owner to secure the pet to their person in a backpack or front pack configuration.

Typically, these types of pet carriers require the user to insert the pet's hind legs through holes in the lower portion of the pet carrier or place the pet's lower body in an open bag-like structure, which may then be zipped up to secure the pet. However, in either case, the pet may buck and kick during the procedure, which may be frustrating for both the pet owner and the pet, and increase the time and difficulty of securing the pet in the carrier.

SUMMARY

Disclosed are various embodiments of a personal pet carrier. The personal pet carrier may include a bag portion to house the lower body of a pet. The sides of the bag may include open slits to facilitate scooping the pet's hind quarters and lower body into the bag. Side adjustment straps are provided near the top of the slits. The side adjustment straps may be attached to one side of the slit and include buckles on the other end to enable adjustment of the straps and to connect with a receiving piece on the other side of the slit.

A pair of shoulder straps may include a bottom portion attached to the bottom of the bag and a top portion with a hook piece. The bag may include loops on both the front and back sides of the bag to accept the hook piece in either a backpack configuration or a front pack configuration, respectively.

A molle harness system may be attached to the back of the bag on each side adjacent to a corresponding slit. A molle adjustment piece may be inserted into a molle appropriate for the size of the pet, and may include the side strap buckle receiving piece.

A collar strap may be connected adjacent to a top side of the back side of the bag portion. The collar strap may be attached near the top side of the bag portion at one end, and include a releasable connector at the other end. The connector may be a buckle system or hook-and-loop connector.

A choke prevention strap may be connected between the collar strap and the front side of the bag portion to prevent the pet from lifting its neck or climbing on the user's shoulders and possibly choking.

DETAILED DESCRIPTION

In an embodiment, a personal pet carrier 100 may be configurable in a backpack configuration or a front pack configuration.

Figure 1:
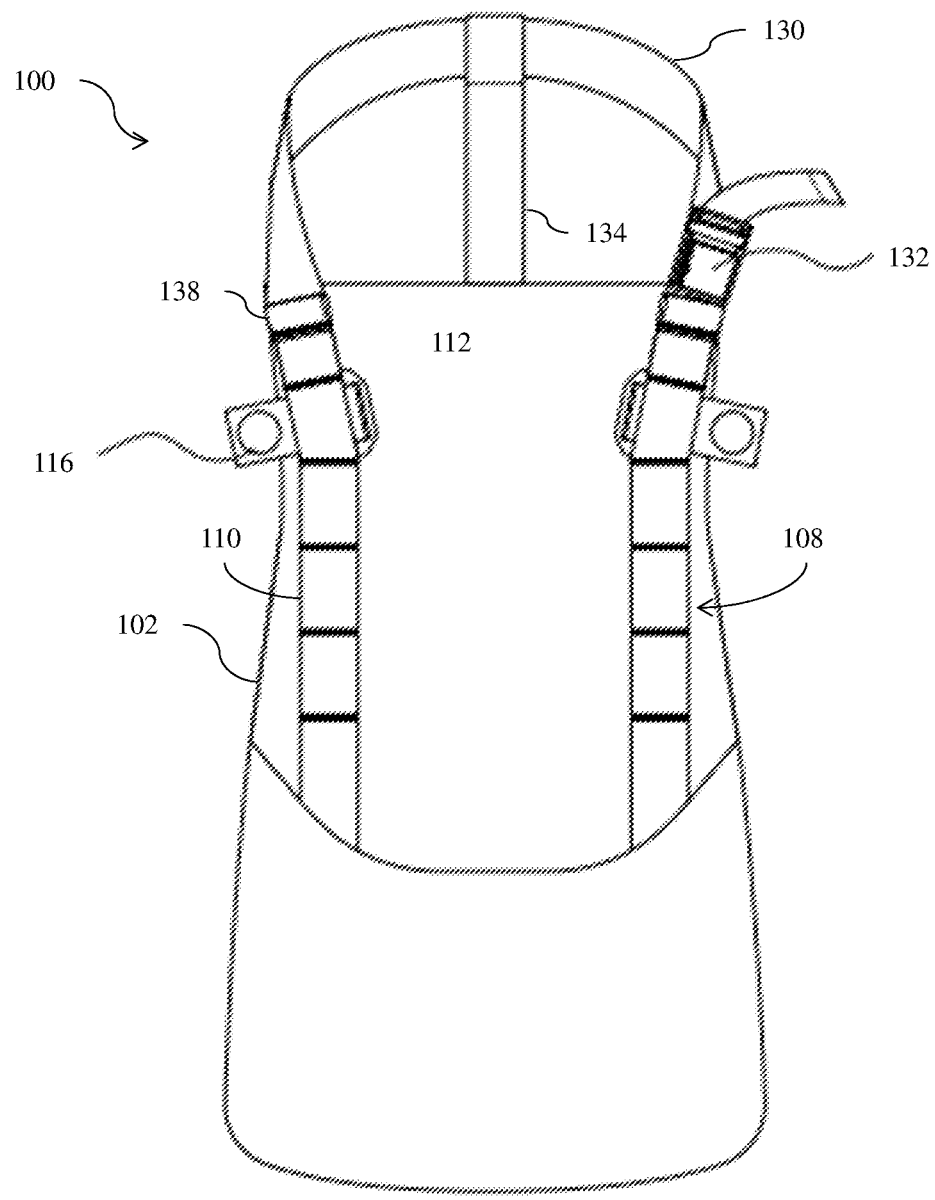
FIG. 1 is an elevation view of a back side of a pet carrier in a backpack configuration according to an embodiment.
Figure 2:
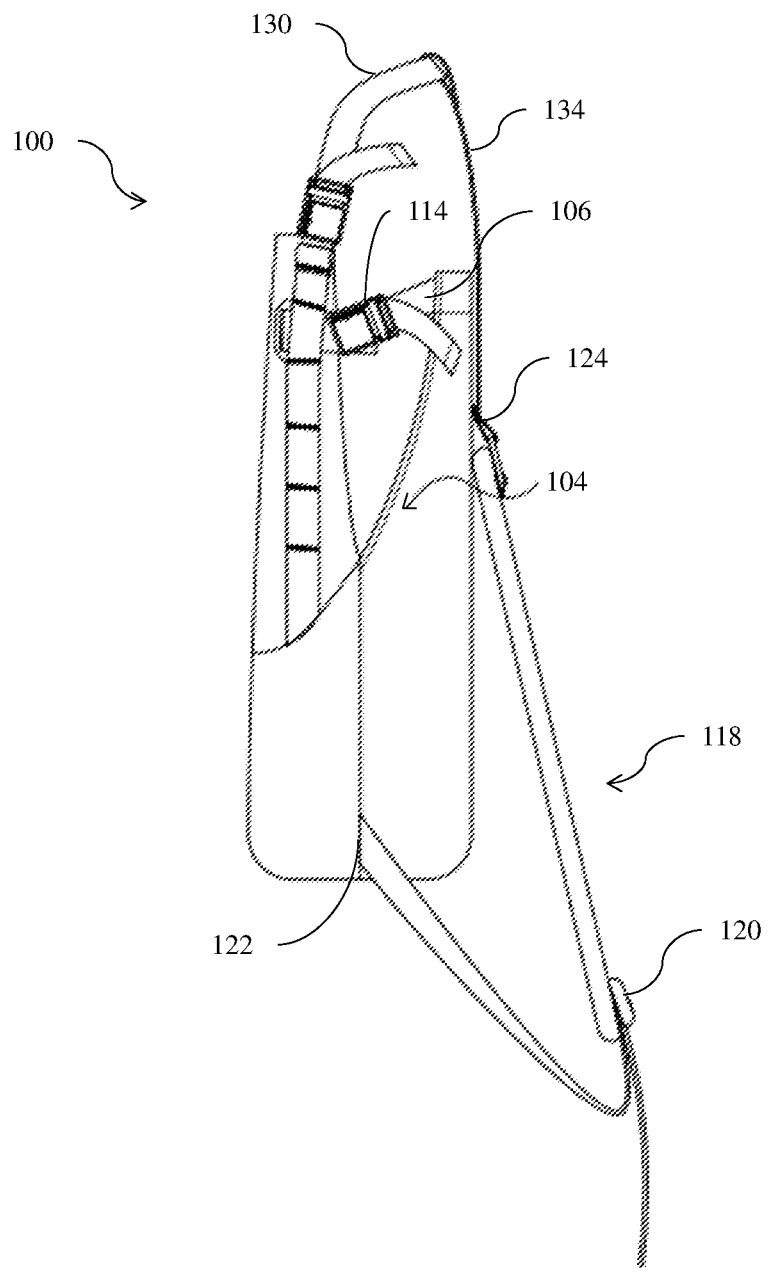
FIG. 2 is an elevation view of a right side of the pet carrier in the backpack configuration.

FIG. 1 shows the front of the personal pet carrier 100 in the backpack configuration. The pet carrier may include a bag portion 102 for housing a pet, for example, a dog. The bag portion 102 may have a sack-like construction, with a closed bottom 103 and an open slit 104 on each side, as shown in FIG. 2. The bag portion may be constructed from durable, washable material(s) such as canvas or nylon.

The bag portion 102 may be made available in different sizes for different sized pets. Side adjustment straps 106 may be provided near the top of each slit to further accommodate different sized pets. A ladder-style, or molle, harness system 108 may be provided on each side of the back side 109 of the bag portion 102 to even further accommodate different sized pets. Each side of the strap system may include a number of molles 110. A T-shaped molle adjustment piece 112 may be placed in a desired molle for connection to the associated adjustment strap. The adjustment straps may include snap buckles 114. The snap buckles may include a male portion, e.g., a stud, (not shown) that snaps into a socket 116 in the associated molle adjustment piece.

Figure 3:
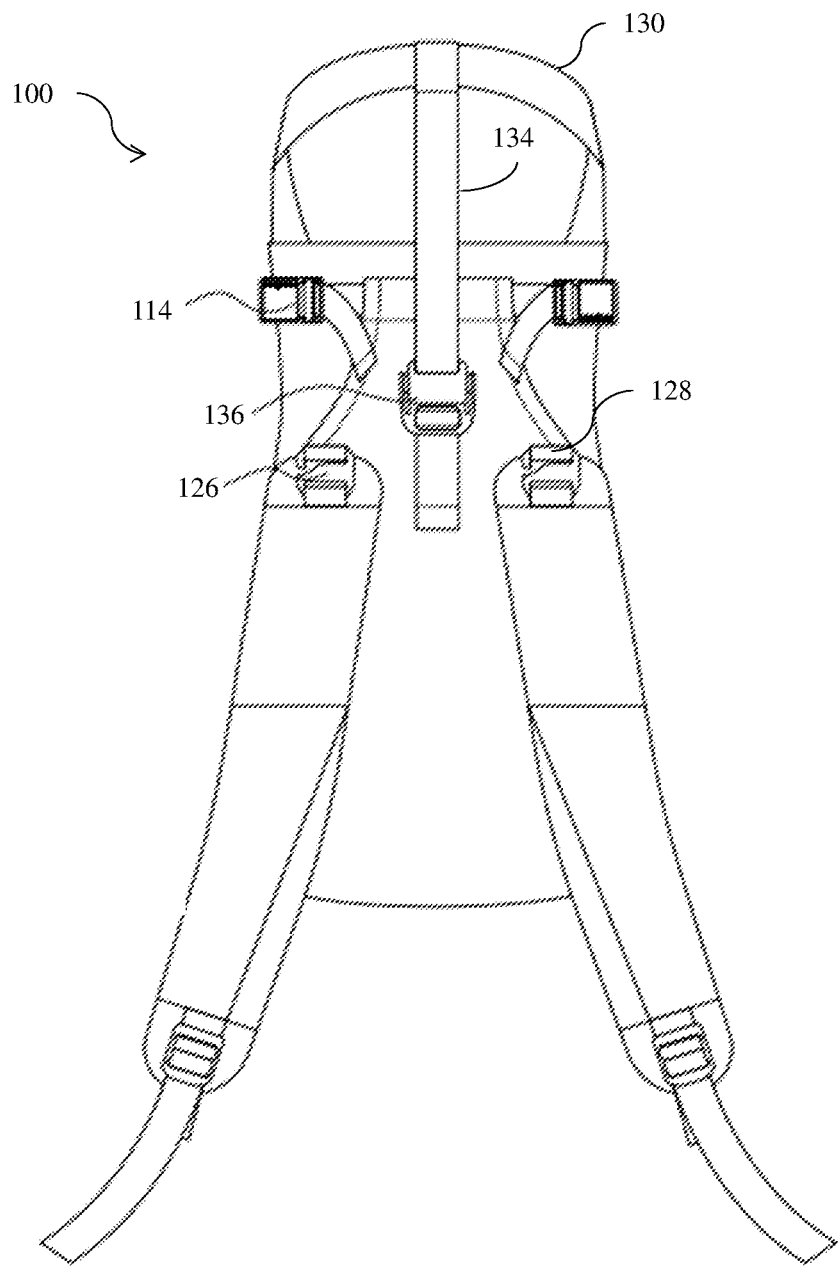
FIG. 3 is an elevation view of a front side of the pet carrier in the backpack configuration.

A pair of shoulder straps 118 may be provided for carrying the bag (FIG. 2). The shoulder straps may include buckles 120 for adjusting the length of the straps to fit a user. A bottom portion 122 of each of a pair of shoulder straps 118 may be attached near the bottom 103 of the bag portion 102, e.g., by stitching. In the backpack configuration, a top portion 124 of each shoulder strap 118 may be connected to the front side 125 of the bag portion 102, as shown in FIG. 3. To attach a shoulder strap to the front side 125 of the bag portion, a hook piece 126 may be inserted into a loop 128 stitched onto the front side 125 of the bag portion 102.

A collar strap 130 to be fit around the pet's throat region may be connected near the top of the front side 125 of bag portion 102. One end of the collar strap 130 may be attached to the bag portion 102, e.g, by stitching, and the other end may be connected to another position on the front side 125 of the bag portion 102 by a locking buckle 132, e.g., a side release clip. The collar strap 130 may be adjusted, for example, via the buckle 132, to accommodate the size of the pet's neck. A choke prevention strap 134 may be connected at one end near the center of the collar strap 130 and at the other end to the front side of the bag portion using an adjustment buckle 136. The choke prevention strap 134 may prevent the pet from a possible choking situation by limiting the upward movement of the pet's head and neck.

Figure 6:
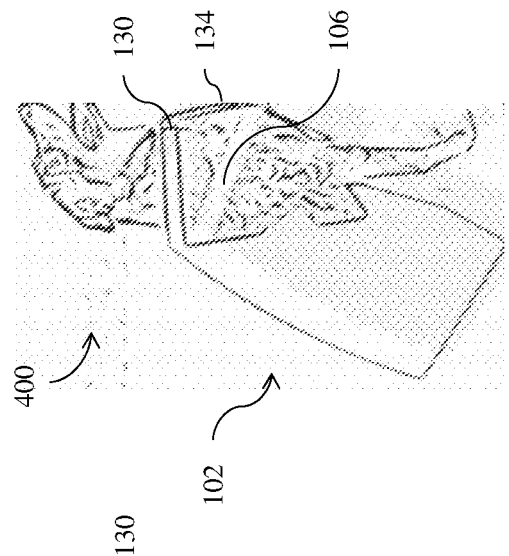
FIGS. 4-6 show steps in an operation for inserting a pet into a pet carrier according to an embodiment.
Figure 5:
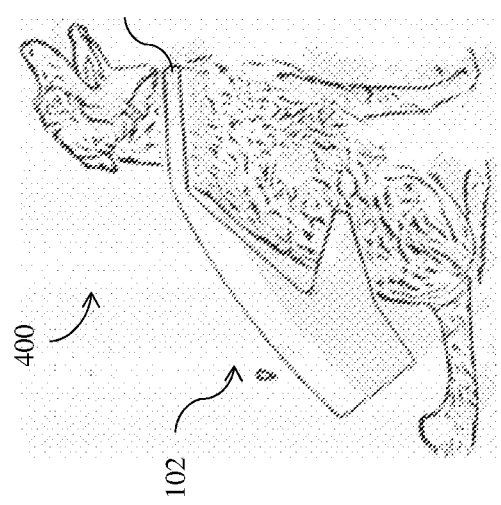
Figure 4:
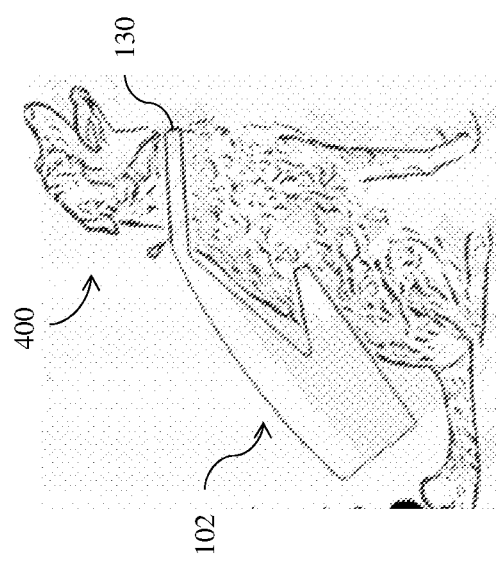

FIGS. 4-6 show steps for inserting a pet 400 into the pet carrier. First, the collar strap 130 may be positioned around the pet's neck and secured, and adjusted if necessary, as shown in FIG. 4. Next, the user may insert the pet's hind quarters in the pet carrier by scooping the pet's lower body into the bag portion 102. This may provide an advantage over other types of pet carriers in which the pet's hind legs may be passed through holes in the lower portion of the pet carrier or zipped into a bag portion as the pet may buck and kick during the procedure, which may be frustrating for both the user and the pet, and increase the time and difficulty of securing the pet in the pet carrier. Once the pet is in the bag portion, the side adjustment straps 106 and choke prevention strap 134 may be secured and adjusted if necessary.

Figure 7:
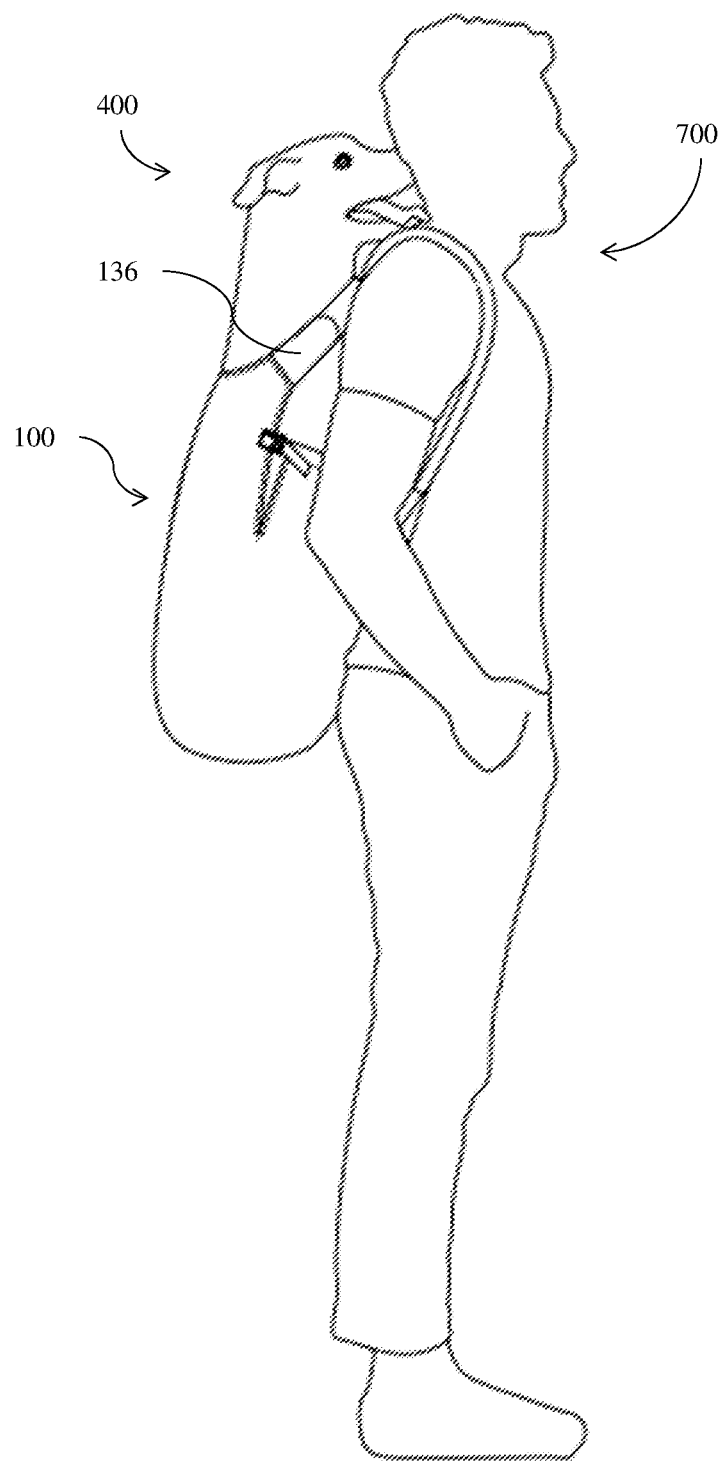
FIG. 7 shows a user carrying a pet in a pet carrier according to an embodiment in a backpack configuration.

Once the pet is secured in the bag portion 102 and the belts and buckles secured, the user may secure the pet to their person using the shoulder straps. FIG. 7 shows a user 700 carrying a pet in a pet carrier in a backpack configuration. In this embodiment, the collar strap 130 may be closed using a hook-and-loop fastener provided on mating portions 136 of the ends of the collar strap.

Figure 8:
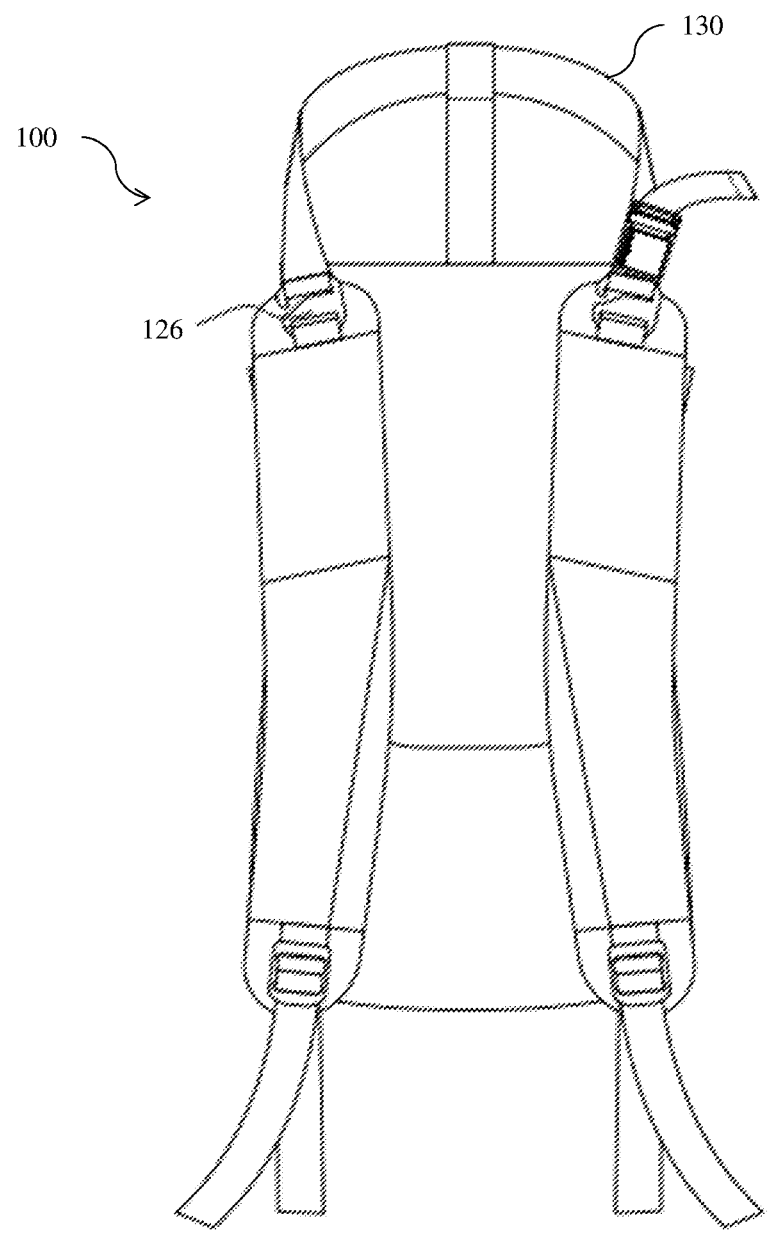
FIG. 8 is an elevation view of the back side of the pet carrier in a front pack configuration.
Figure 9:
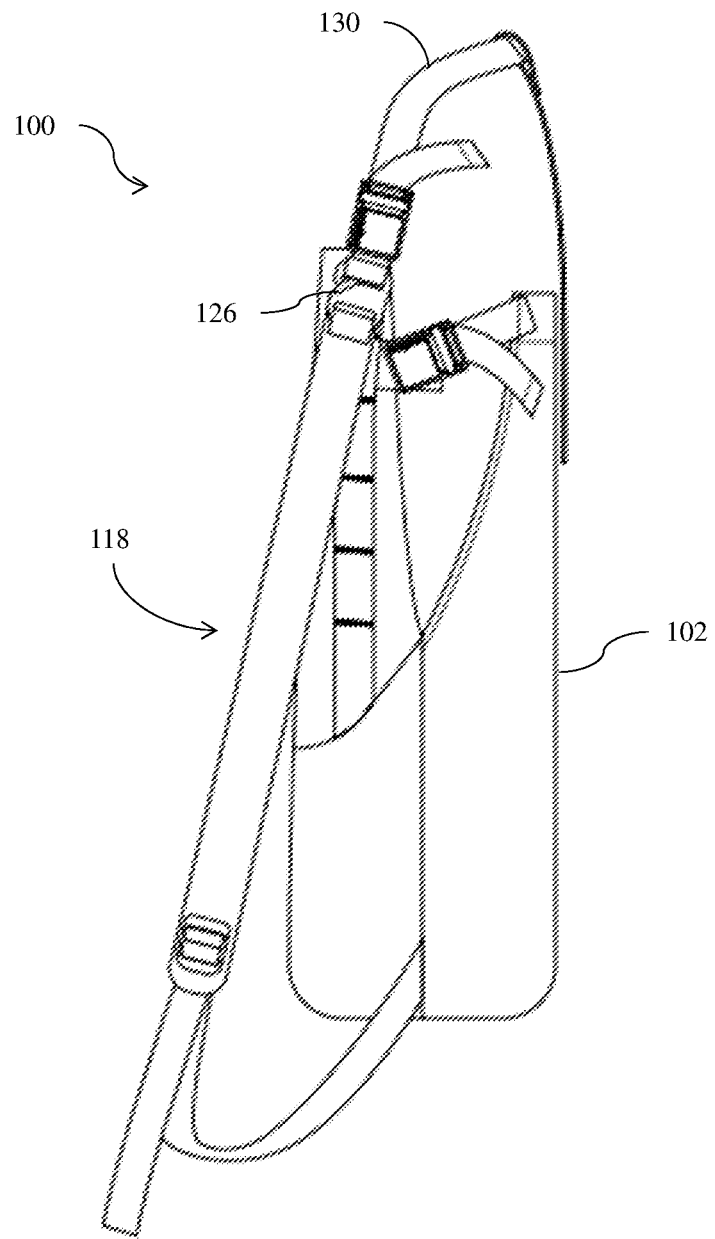
FIG. 9 is an elevation view of the right side of the pet carrier in the front pack configuration.
Figure 10:
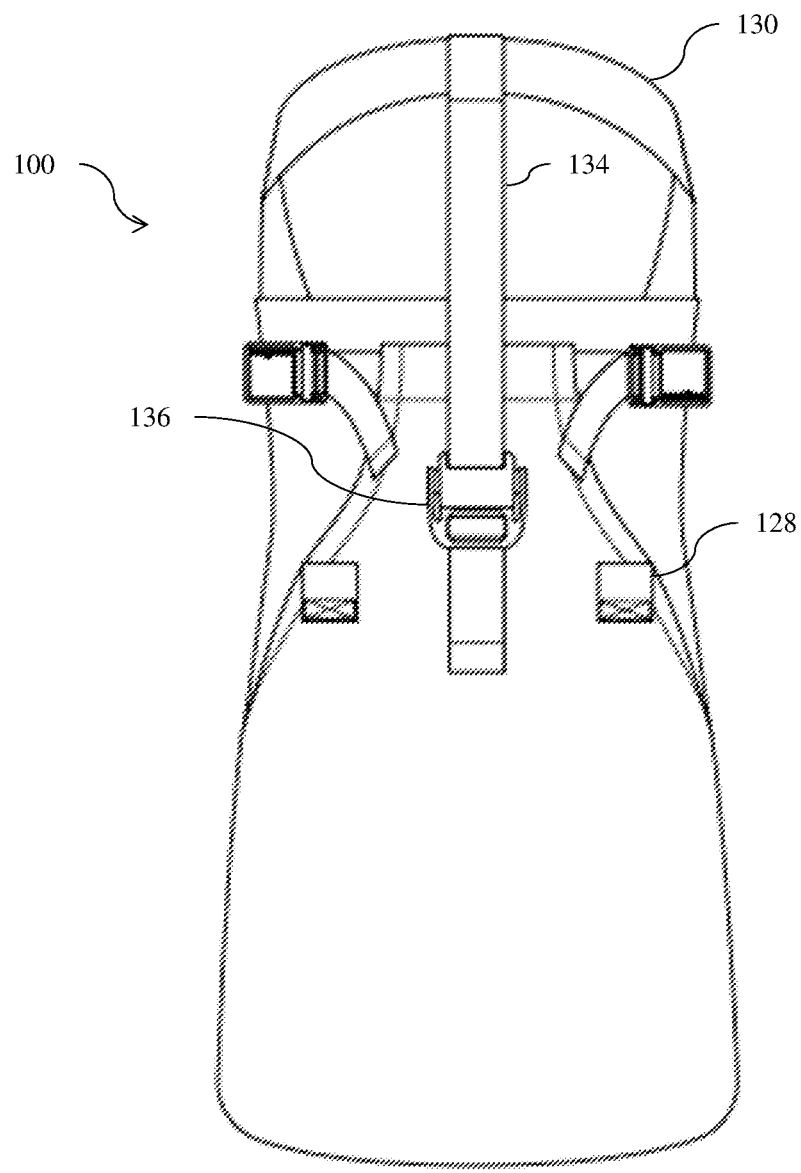
FIG. 10 is an elevation view of the front side of the pet carrier in the front pack configuration.

FIGS. 8-10 show the pet carrier 100 arranged in the front pack configuration. In the front pack configuration, instead of securing the hook piece 126 at the end of each shoulder strap to the loop 128 on the front side of the bag portion 102, the hook pieces 126 are inserted into corresponding loops 138 provided above the top molle of the ladder-style strap system.

The foregoing method descriptions and diagrams/figures are provided merely as illustrative examples and are not intended to require or imply that the operations of various aspects must be performed in the order presented. As will be appreciated by one of skill in the art, the order of operations in the aspects described herein may be performed in any order. Words such as "thereafter," "then," "next," etc. are not intended to limit the order of the operations; such words are used to guide the reader through the description of the methods and systems described herein. Further, any reference to claim elements in the singular, for example, using the articles "a," "an," or "the," is not to be construed as limiting the element to the singular.

The preceding description of the disclosed aspects is provided to enable any person skilled in the art to make, implement, or use the claims. Various modifications to these aspects will be readily apparent to those skilled in the art, and the generic principles defined herein may be applied to other aspects without departing from the scope of the claims. Thus, the present disclosure is not intended to be limited to the aspects illustrated herein but is to be accorded the widest scope consistent with the claims disclosed herein.

The invention claimed is:

1. A personal pet carrier, comprising:
   a bag portion including a front side and a back side connected on a bottom of the bag portion and partially up at least one side to form an open slit;
   a side strap having a first end connected adjacent to a top portion of the open slit on the front side of the bag portion and a second end including a buckle;
   a molle harness system attached to the back side of the bag portion adjacent to the open slit, the molle harness system including a plurality of molles;
   a molle adjustment piece adapted to fit into any of said plurality of molles to adjust a height of the molle adjustment piece, the molle adjustment piece including a buckle receiving piece connector;
   a buckle receiving piece adapted to connect with the buckle receiving piece connector of the the molle adjustment piece and the buckle on the second end of the side strap;
   at least one shoulder strap including a first end attached to the bottom of the bag portion and a second end including a hook piece;
   a first loop attached to the front side of the bag and adapted to accept the hook piece in a backpack configuration;
   a second loop positioned above a top molle of the plurality of molles and adapted to accept the hook piece in a front pack configuration;
   a collar strap connected adjacent to a top side of the back side of the bag portion; and
   a choke prevention strap connected between the collar strap and the front side of the bag portion.

2. The personal pet carrier of claim 1, wherein the collar strap includes a first end attached to a first position on the back side of the bag portion and a second end including a connector piece, and
   wherein a connector receiving piece is attached to a second position on the back side of the bag portion.

3. The personal pet carrier of claim 2, wherein the connector piece comprises a buckle and the connector receiving piece comprises a buckle receiving piece.

4. The personal pet carrier of claim 2, wherein the connector piece and the connector receiving piece comprise hook-and-loop fasteners.

* * * * *